(12) United States Patent
Budd et al.

(10) Patent No.: US 9,341,828 B2
(45) Date of Patent: May 17, 2016

(54) MULTI-CORE FIBER OPTICAL COUPLING ELEMENTS

(75) Inventors: Russell A. Budd, North Salem, NY (US); Frank R. Libsch, White Plains, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 1327 days.

(21) Appl. No.: 13/077,765

(22) Filed: Mar. 31, 2011

(65) Prior Publication Data

US 2012/0251045 A1  Oct. 4, 2012

(51) Int. Cl.
*G02B 6/36* (2006.01)
*G02B 13/26* (2006.01)
*G02B 13/22* (2006.01)

(52) U.S. Cl.
CPC ............. *G02B 13/26* (2013.01); *G02B 13/22* (2013.01)

(58) Field of Classification Search
None
See application file for complete search history.

(56) References Cited

U.S. PATENT DOCUMENTS

| | | | |
|---|---|---|---|
| 4,275,962 A * | 6/1981 | Midorikawa et al. | 355/1 |
| 6,078,708 A | 6/2000 | de la Tocnay et al. | |
| 6,659,654 B2 | 12/2003 | Kao | |
| 7,044,655 B2 | 5/2006 | Kato et al. | |
| 7,123,809 B2 | 10/2006 | Yamamoto et al. | |
| 7,218,811 B2 * | 5/2007 | Shigenaga et al. | 385/33 |
| 7,343,068 B2 | 3/2008 | Shigenaga et al. | |
| 7,548,674 B1 | 6/2009 | Horibe et al. | |
| 7,613,371 B2 | 11/2009 | Ankerhold | |
| 7,845,860 B2 | 12/2010 | Fiorentino et al. | |
| 2003/0081897 A1 * | 5/2003 | Itoh et al. | 385/34 |
| 2007/0051763 A1 * | 3/2007 | Adrian | 224/274 |
| 2007/0057163 A1 * | 3/2007 | Ishigami et al. | 250/216 |
| 2007/0183709 A1 * | 8/2007 | Furuno et al. | 385/14 |
| 2008/0226228 A1 | 9/2008 | Tamura et al. | |
| 2008/0310799 A1 | 12/2008 | Jacobowitz et al. | |
| 2009/0154884 A1 | 6/2009 | Chen et al. | |

FOREIGN PATENT DOCUMENTS

JP  56119105 A  *  9/1981

OTHER PUBLICATIONS

"Connectorized Optical Link Package Incorporating a Microlens" Johnson, B., et al. Components, Hybrids, and Manufacturing Technology, IEEE Transactions on vol. 3, Issue 4, Publication Year 1980, pp. 488-492.

"Design Rules for Highly Parallel Free-Space Optical Interconnects" Kirk, A.G., et al. Selected Topics in Quantum Electronics, IEEE Journal of vol. 9, Issue 2, Publication Year 2003; pp. 531-547.

(Continued)

*Primary Examiner* — Hemang Sanghavi
(74) *Attorney, Agent, or Firm* — Anthony Canale; Andrew M. Calderon; Roberts Mlotkowski Safran & Cole, P.C

(57) ABSTRACT

An optical coupling system includes a first unit including a source of light or a first multi-core optical fiber, each of the source and the first multi-core optical fiber including at least a first aperture, a second unit including a second multi-core optical fiber including at least a second aperture corresponding to the first aperture of the first unit, and a lens array unit redirecting light between the first unit and the second unit, the lens array unit substantially matching light rays transmitted or received between the first aperture of the first unit and the corresponding second aperture of the second unit.

22 Claims, 13 Drawing Sheets

(56) References Cited

OTHER PUBLICATIONS

"Novel Releasable Multi-Fiber Optical Connectivity Solution for Optical Communication Using V-Grooves and Micro-Lens Arrays"; Kunde, J., et al. Electronics System Integration Technology Conference, 2006. 1st vol. 1, Publication Year: 2006, pp. 268-27.

"Integration of Micro-Optics with a Fiber Array Connector Using Passive Alignment Technique for Parallel Optics Applications"; Han, H., et al. Electronic Components and Techonology Conference, 2004; Proceedings. 54th vol. 1, Publication Year 2004; pp. 1012-1015.

* cited by examiner

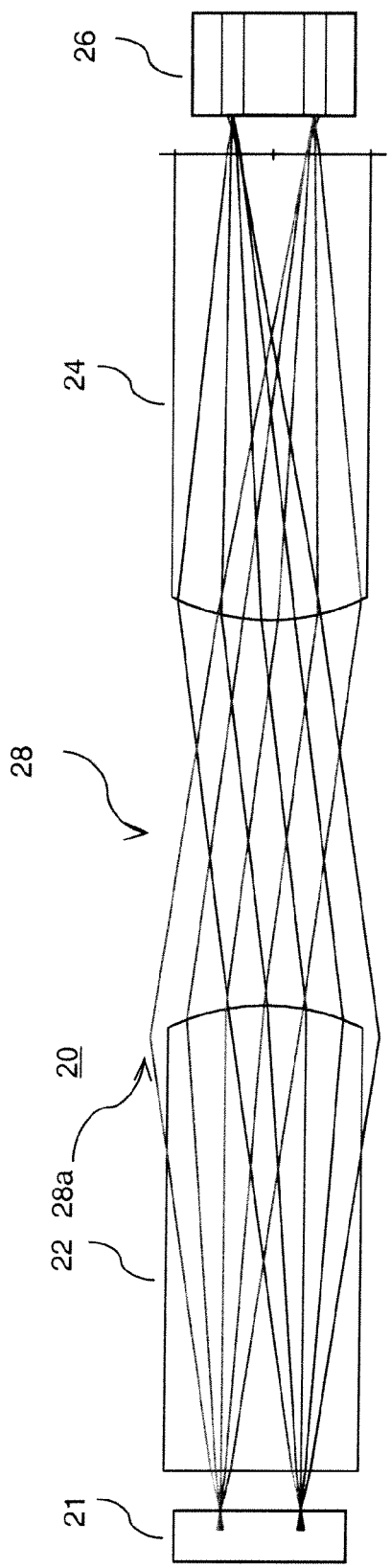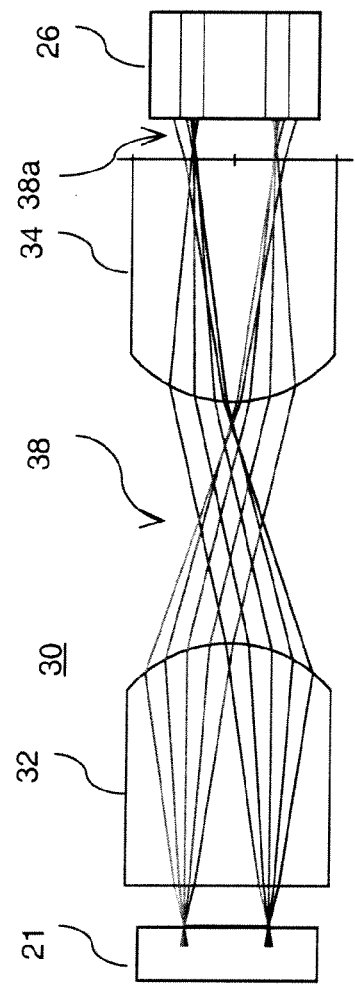
Fig. 2 (Related Art)
Fig. 3 (Related Art)

MULTI-CORE FIBER OPTICAL COUPLING ELEMENTS

BACKGROUND OF THE INVENTION

1. Field of the Invention

The disclosed invention relates generally to integrated circuits and silicon chip technology, and more particularly, but not by way of limitation, the packaging of optoelectronic devices in a dense and integrated manner.

2. Description of the Related Art

Optical transceivers are increasingly used to enable data communication between and within computers. An optical transceiver can transmit and receive data using optical fiber rather than electrical wire. The optical fiber can be used to facilitate the transfer of information in light beams, rays or pulses along solid transparent fibers or cables. One of the major advantages of optical technology is its high transfer rate.

However, today's optical transceiver packages are bulky, complex and expensive. The performance of high-end computers systems continues to improve as the number of processing cores (and their speed) is increased. This increase in the number of processors requires a corresponding improvement in the system's interconnect bandwidth. Today's high-end supercomputer systems are being built with hundreds of thousands of individual optical fibers to transmit this data, at considerable expense.

The communication bandwidth between computers and within a computer is playing an increasing role in a system's overall performance. The trend towards multi-core processors and multiple processors per machine requires an increase in communication between processors and between a processor and its memory. Electrical data links perform well over short distances, but they reach a limit as the link distance and frequency increases. Optical data links over fiber are capable of high speed communication with low loss over large distances. However, current optical transceivers are bulky and expensive compared with their electrical counterparts.

Currently, a standard 12 channel optical transceiver can be mated with a 12 fiber ribbon cable, with each fiber containing only 1 core. However, a single core in the optical fiber increases the space that is used by the arrangement and can be expensive.

Recently it has been proposed to use multiple graded index and/or single mode cores inside a single optical fiber to save space and reduce cost. What is needed is a means to couple the light into and out of these new multi-core fibers in a simple and low cost manner. In further detail, what is also needed is a means to couple light from OE (opto-electronic) devices, such as VCSELs (vertical cavity surface emitting lasers) and photodiodes, into a multi-core fiber.

There is a related art method to couple multi-core fiber to a VCSEL/PD (vertical cavity surface emitting lasers/photodiode) array. In this case the multi-core fiber contains 4 cores. The multi-core fiber is butt coupled to a 4 element VCSEL array.

However, the multi-core fiber must be close to the active device of the VCSEL array for best coupling, but not touch the VCSEL array. If the fiber touches the VCSEL array, then the VCSEL array may be damaged. There is possible damage during assembly, and the optical fiber is not easily connectorized.

Another problem relates to the NA (numerical aperture) of the VCSEL that may be greater than a typical NA of a multi-mode fiber. Therefore, given this mismatch in NAs, a coupling loss may occur, leading to a lower overall optical coupling efficiency. Therefore, the VCSEL NA not matching, but instead overfilling the fiber NA, leads to lower efficiency. These limitations reveal that the fiber-to-VCSEL "butt" coupling method is less than optimal.

In another arrangement, a long focal length dual lens optical coupling arrangement shows poor optical performance when used with a multi-core fiber. The long focal length dual lens optical coupling arrangement has been previously used to couple light between single core optical fibers rather than a multi-core fiber. A relatively long focal length lens can successfully image the core from one fiber to another.

However, when a multi-core fiber is used, the cores are offset from the center axis of the lens. The object (core) offset causes light from the source to miss a portion of the collimating lens, leading to a loss of light (lower efficiency) and potential cross-talk between neighboring fibers.

Another arrangement includes a short focal length dual lens optical. In this case the focal length of the collimating lenses or telecentric lens pair is short so that the light from the offset source does not miss the collimating lens. However, given the lens short focal length and the offset source, it is difficult to focus the light into the multi-core fiber. For example, the light ray misses the core of the multi-core fiber. The offset sources requires tight lens manufacturing tolerances. The alignment tolerances of optoelectronic elements (OE), such as VCSEL, in the X, Y, and Z axis are critical. The light rays at the multi-core fiber are abberated and overfill the cores, possibly leading to a drop in coupling efficiency and a potential for cross-talk between optical channels.

Accordingly, it is desirable to provide an apparatus and method to optically interconnect a multi-core optical fiber with a compact optical transceiver in order to improve optical coupling performance, and to have a simpler package and lower cost. Moreover, concerning the desire for improved optical coupling performance, there is a desire to reduce or avoid a loss of light and potential for cross-talk between optical channels.

In addition, it is also desirable to provide a means to reduce the number of optical transceivers needed by a computer system by using multi-core optical fibers to increase the number of optical channels while maintaining or reducing the optical transceiver's package size.

SUMMARY OF INVENTION

In view of the foregoing and other problems, disadvantages, and drawbacks of the aforementioned background art, an exemplary aspect of the disclosed invention provides a means to optically interconnect multi-core optical fiber with a compact optical transceiver by using unique optical elements, thereby leading to improved optical coupling performance, a simpler package and lower cost.

Moreover, an exemplary aspect of the disclosed invention also provides a means to reduce the number of optical transceivers needed by a computer system by using multi-core optical fibers to increase the number of optical channels while maintaining or reducing the optical transceiver's package size.

In addition, a disclosed exemplary embodiment of invention provides a means to interconnect a transceiver with an optical fiber containing multiple cores instead of the standard single core optical fibers, thereby dramatically increasing the number of available optical channels without increasing the transceiver's package size and costs.

In accordance with one exemplary aspect of the disclosed invention, an optical coupling system includes a first unit including a source of light or a first multi-core optical fiber, each of the source and the first multi-core optical fiber including at least a first aperture, a second unit including a second multi-core optical fiber including at least a second aperture corresponding to the first aperture of the first unit, and a lens array unit redirecting light between the first unit and the second unit, the lens array unit substantially matching light rays transmitted or received between the first aperture of the first unit and the corresponding second aperture of the second unit.

Moreover, the array unit can include a field lens configured to redirect light toward a center of a light path from the first unit to the second unit. The lens array unit can also include a dual sided lens array including a field lens facing the first unit and a collimating lens on another side of the field lens to redirect light toward a center of a light path from the first unit to the second unit. The lens array unit can also include a dual sided lens array, where the dual sided lens array includes a first dual sided lens including a field lens facing the first unit and a collimating lens on another side of the field lens to redirect light toward a center of a light path from the first unit to the second unit, and a second dual sided lens including a field lens facing the second unit and a collimating lens on another side of the field lens to receive or send light between the first and second dual sided lenses in order to redirect light toward a center of a light path from the first unit to the second unit.

The optical coupling system can also include a field lens arranged on the first unit. The first unit can include the first multi-core optical fiber. The lens array unit can include a lens pair, with a first lens having a focal length different than a focal length of a second lens to select a magnification or reduction of transmitted and received light in order to reduce a numerical aperture of light received at the second multi-core optical fiber or the first multi-core optical fiber.

The lens array unit can include a first dual sided lens being adjacent to the first unit, and a second dual sided lens being adjacent to the second unit and having a focal length greater than a focal length of the first dual sided lens. The first unit can include the source including at least two source points set apart, and the lens array unit includes a curved mirror field lens and a reflective prism element that translates the light beams towards an optical centerline between the first unit and the second unit.

The first unit can include the first multi-core optical fiber, and the first and second multi-core optical fibers each have a convex shaped end facing the lens array unit to redirect light toward a center line of an optical path between the first unit and the second unit. The source in the first unit can include a vertical cavity surface emitting laser (VCSEL) and/or a photodiode (PD) array.

The optical coupling system can also include the source in the first unit including an opto-electronic (OE) module including the lens array unit with conductive wiring. The source in the first unit can include an opto-electronic (OE) module including the lens array unit with conductive wiring.

The optical coupling system can also include the source in the first unit including a complementary metal-oxide semiconductor device integrated with laser diode drivers/transimpedance amplifier (CMOS LDD/TIA) with an opening for an insertion of the lens array unit. The source in the first unit can include an OE module, and the lens array unit can include a dual sided lens array attached to a ferrule optical connector.

The source in the first unit can include an OE module, and the lens array unit can include a dual sided lens array with an optical connector including dual lenses, a turning mirror, and guide holes for the second multi-core optical fiber. The second unit can include a flat portion in a fiber cladding and a corresponding flat portion in a fiber ferrule for fiber rotational orientation.

The second unit can include a groove in a fiber cladding of the second multi-core optical fiber for fiber rotational orientation. The optical coupling system can also include a dual sided lensed optical connector to couple the second multi-core optical fiber of the second unit with the lens array unit and the first unit.

In accordance with still another exemplary aspect of the disclosed invention, a telecentric imaging system for an optical coupling device includes an array of dual sided lenses, including a first dual sided lens unit including a lens facing a source object of light to direct light from the source to a multi-core optical fiber toward an optical center line between the source and the multi-core optical fiber, and a second dual sided lens unit set apart from the first dual sided lens unit, the second dual sided lens unit being next to the multi-core optical fiber to direct light between the source and the multi-core optical fiber unit toward the optical center line between the source and the multi-core optical fiber unit.

The first dual sided lens unit includes a first field lens facing the source object and a first collimating lens on another side of the first dual sided lens unit to direct light toward an optical center line between the source and the multi-core optical fiber, and the second dual sided lens unit includes a field lens facing the multi-core optical fiber unit and a second collimating lens facing the first collimating lens to direct light toward an optical center line between the source and the multi-core optical fiber unit.

At least one of the first dual sided lens unit and the second dual sided lens unit includes a field lens to direct light from an aperture of the source object to a corresponding aperture of the multi-core optical fiber. At least one of the first dual sided lens unit and the second dual sided lens unit includes field lens means to substantially match the light received to apertures of the multi-core optical fiber.

In accordance with yet another exemplary aspect of the disclosed invention, a method of an optical coupling system includes transmitting light from a source object to a multi-core optical fiber, receiving the light, by the multi-core optical fiber, from the source object, and redirecting light, by a dual-sided lens array, from the source object to the multi-core optical fiber, the dual-sided lens array substantially matching light rays emitted from points of the source object and light rays received at corresponding points of the multi-core optical fiber. The redirecting of light can include redirecting the light toward a center of a light path from the source object to the multi-core optical fiber by the dual-sided lens array including a field lens.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 2 illustrates a side view of a long focal length dual lens optical coupling arrangement the related art.

FIG. 3 shows a side view of a short focal length dual lens optical coupling arrangement of a related art.

DETAILED DESCRIPTION OF EXEMPLARY EMBODIMENTS

Figure 1B:
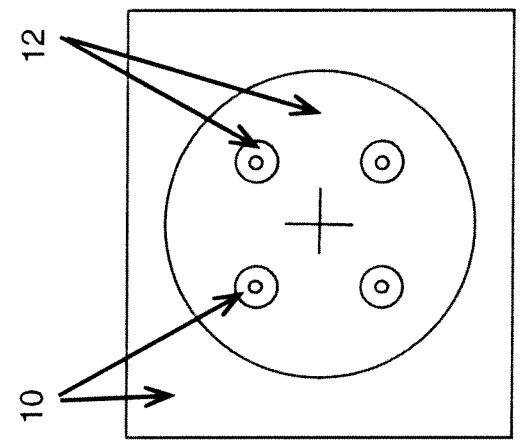
FIGS. 1A and 1B illustrate side and end views, respectively, of a multi-core fiber butt coupled to a VCSEL array of the related art.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity.

The current standard, for example, is a 12 channel optical transceiver mating with a 12 fiber ribbon cable, with each fiber containing only a single core. However, an exemplary aspect of the invention provides a means to interconnect a modified version of today's transceiver with an optical fiber containing multiple cores, thereby dramatically increasing the number of available optical channels without increasing the transceiver's package size.

Therefore, an exemplary embodiment in accordance with the invention provides an apparatus and technique to optically interconnect multi-core optical fiber with a compact optical transceiver by using unique optical elements, thereby leading to improved optical coupling performance, a simpler package and lower cost Typical single core multi-mode fibers have a cladding diameter of 125 microns and a core size of 50 microns. Newer multi-core multi-mode fibers may contain 2 or more cores surrounded by cladding with a diameter of 80 microns or more, typically 125 microns. By including more cores in a 125 micron clad fiber, more optical channels are available for data transmission, thus increasing the fiber's optical bandwidth. As mentioned previously, there is a need for an apparatus and technique to couple light from OE (opto-electronic) devices, such as VCSELs and photodiodes, into a multi-core fiber.

Figure 1A:
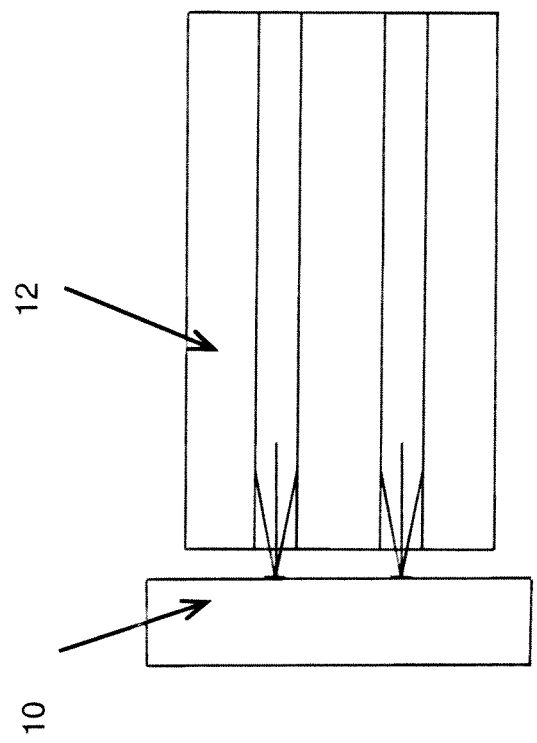

Referring to FIGS. 1A and 1B, a method to couple multi-core fiber to a VCSEL/PD (vertical cavity surface emitting lasers/photodiode) array is provided of the related art. In this case the multi-core fiber 12 contains 4 cores each with a core size of 50 microns, in a cladding of 125 microns. The fiber is butt coupled to a 4 element VCSEL array 10. However, there are a plurality of problems in such proposals of butt coupling the VCSEL/PD array 10 with the multi-core fiber 12.

For example, the multi-core fiber 12 must be close to the active device of the VCSEL array 10 for best coupling, but not touch the VCSEL array 10. If the fiber touches the VCSEL array 10, then the VCSEL array 10 may be damaged. Therefore, there is possible damage during assembly and such an arrangement is not easily connectorized.

The NA (numerical aperture) of the VCSEL is typically 0.25-0.3, which may be greater than a typical multi-mode fiber which has an NA of 0.2-0.25. Therefore, given this mismatch in NAs, a coupling loss may occur, leading to a lower overall optical coupling efficiency. Therefore, the VCSEL NA (numerical aperture) not matching, but instead overfilling the fiber NA, leads to lower efficiency. These limitations reveal that the optical fiber to VCSEL 'butt' coupling method is less than optimal.

Referring to FIG. 2, a long focal length dual lens optical coupling arrangement 20 of a related art shows poor optical performance when used with a multi-core fiber 26. The long focal length dual lens optical coupling arrangement has been previously used to couple light between single core optical fibers rather than a multi-core fiber. With a single core of 50 microns diameter the object (core) radius is 25 microns. A relatively long focal length lens, between 400-1000 microns focal length, can successfully image the core from one fiber to another.

However, when a multi-core fiber 26 is used, the cores are offset from the center axis of the lens, typically by 30 or more microns. The source 20 transmits through the collimating lens or telecentric lens pair 22 and 24 to the multi-core fiber 26. The object (core) offset causes light 28 (e.g., light ray 28a) from the source 21 to miss a portion of the collimating lens 22, leading to a loss of light (lower efficiency) and potential cross-talk between neighboring fibers. The offset source also overfills the lens aperture (for, e.g., a 250 μm lens pitch). Therefore, there is optical power lost and also potential for crosstalk.

Referring to FIG. 3, a short focal length dual lens optical coupling arrangement 30 of a related art is provided. In this case the focal length of the collimating lenses or telecentric lens pair 32 and 34 is short, typically between 100-400 microns, so that the light from the offset source 21 does not miss the collimating lens 32 or 34 as occurring with the longer focal length collimating lenses 22 and 24 of FIG. 2. However, given the short focal length of the lens and the offset source 21, it is difficult to focus the light 38 into the multi-core fiber 26. For example, light ray 38a misses the core of the multi-core fiber 26. The offset sources require tight lens manufacturing tolerances. The alignment tolerances in the X, Y, and Z axis of opto-electronic elements (OE), such as VCSEL, are critical. The light rays at the multi-core fiber are abberated and overfill the cores, leading to a drop in coupling efficiency and a potential for cross-talk between optical channels.

Figure 4A:
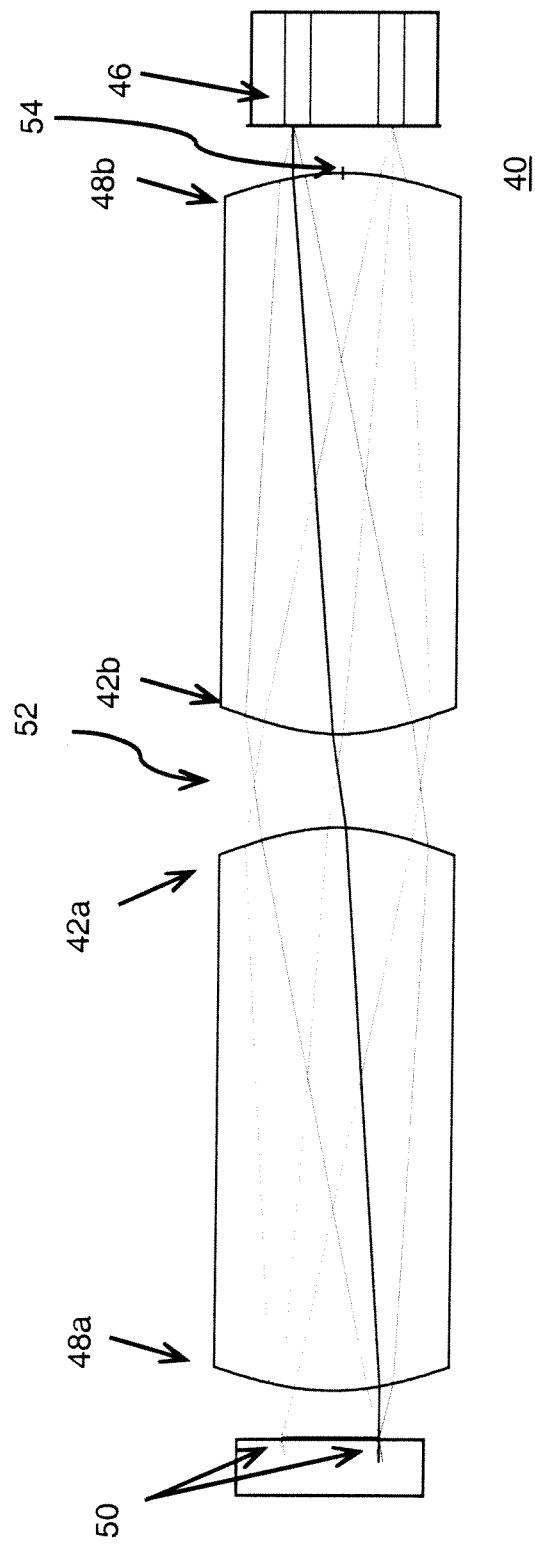
FIGS. 4A to 4C illustrate side views of a dual lens with field lens approach optical coupling arrangement of exemplary embodiments of the invention.

Referring to FIG. 4A, a dual lens with a field lens provides an optical coupling arrangement 40 of an exemplary embodiment of the invention. In this arrangement of the optical coupling device 40, a field lens 48a is added next to the source 50 and a field lens 48b is added next to the multi-core fiber 46. The source or sources 50 can be, for example but not limited to, a VCSEL source.

The field lens 48 is configured to redirect the light 52 from the source 50 towards the center of the collimating lens 42, thereby passing all the light 52 through the imaging system of the arrangement for the optical coupling device 40 and thus eliminating the optical inefficiencies described in, for example, FIG. 2.

Moreover, given the longer focal length of the collimating lens, it is possible to realize a high image quality at the input to the multi-core fiber 46, thus eliminating the potential for cross-talk between cores.

In further detail, referring again to FIG. 4A, with the addition of the field lens 48a and 48b, the field lens points the off-axis source rays toward the lens center 54. Therefore, with such a configuration, there is a reduction in the aberration of off-center rays. In addition, the optical loss due to aberration is minimized. Moreover, telecentricity is maintained in the dual lens with field lens approach optical coupling apparatus 40. Therefore, a telecentric imaging system can be provided with the addition of the field lens. Additionally, normal (longer) focal length lenses are also possible, which simplifies lens manufacture.

Figure 4B:
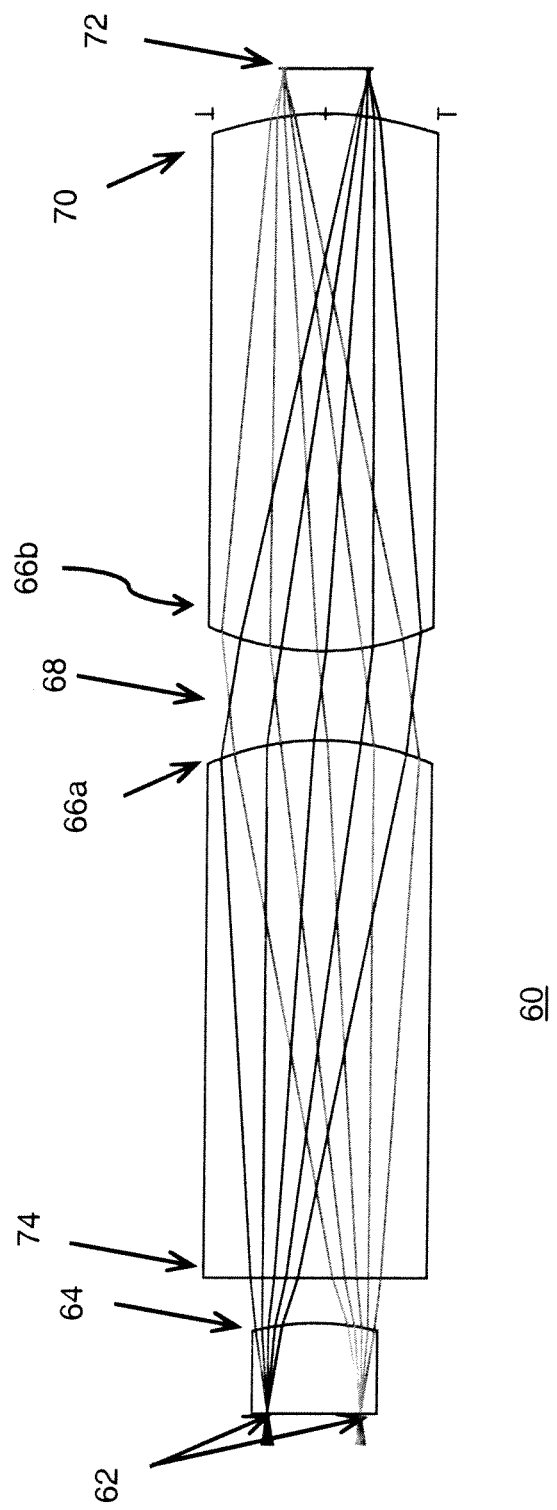

Referring to FIG. 4B, another exemplary embodiment is provided of an optical coupling system 60. A telecentric imaging system is provided with a field lens 64 added on top of the OE device (e.g., VCSEL, PD, etc.) 62 in the optical coupling system 60. A collimating lens pair 66a and 66b directs the light rays from the field lens 64. A field lens 70 can be provided next to the multi-core fiber 72. With the addition of the field lens 64 on the OE device 62, the field lens 64 receives the light rays 68 from the source of the OE device 62 and points the off-axis source rays toward the lens center.

Therefore, the field lenses 64 and 70 are configured to redirect the light 68 from the source of the OE device 62 towards the center of the collimating lens 66a and 66b thereby passing all the light 68 through the imaging system of the optical coupling system 60 and thus eliminating the optical inefficiencies of the related art addresses the concept of adding a field lens on the OE (VCSEL, PD) device.

The field lens 64 can be added on top of the OE device (e.g., VCSEL, PD, etc.) 62 by, for example, depositing a transparent photoresist on the OE, patterning and developing a mesa array, then reflowing the photoresist in an oven to form a convex lens.

Figure 4C:
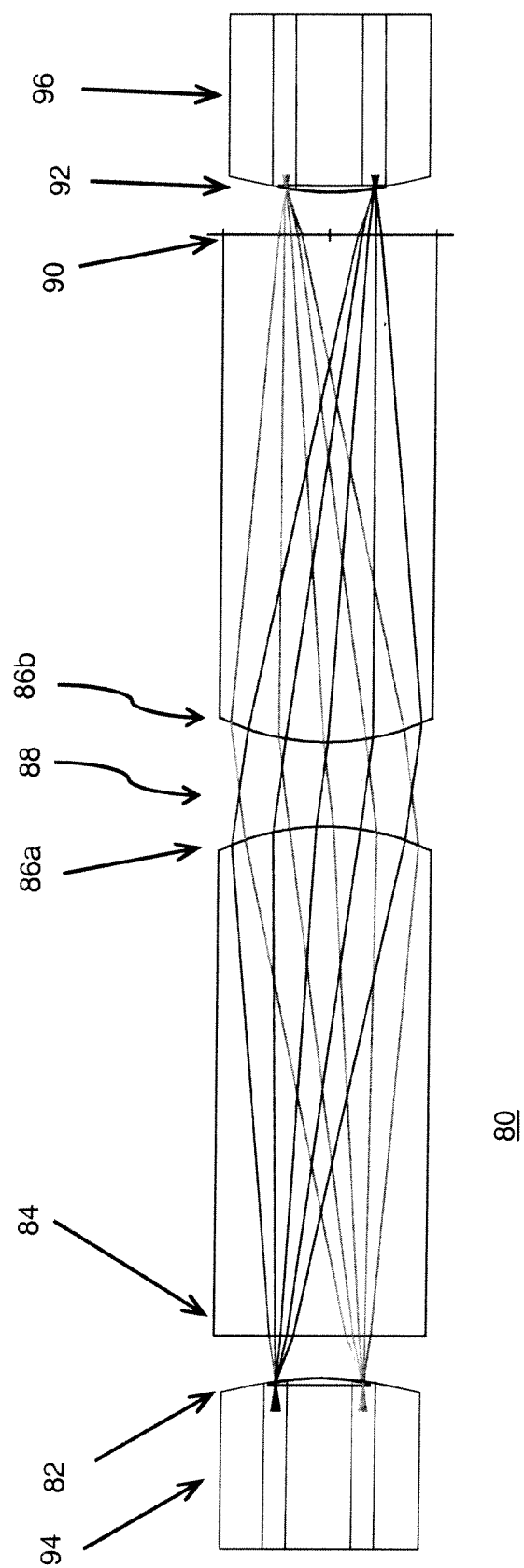

Referring to FIG. 4C, another exemplary embodiment is provided of an optical coupling system 80. The optical coupling system is a multi-core fiber to multi-core fiber coupler. The multi-core fiber end portions 82 and 92 are curved to provide the function of a field lens.

In further detail, the multi-core fiber 94 has an end portion 82 that transmits the light toward a plane surface 84 of the collimating lens 86a and/or receives the light from the plane surface 84. The end portion 82 of the multi-core fiber 94 is shaped with a curved surface (e.g., convex shape) to provide a function of a field lens.

A second plane surface 90 is provided at an end of the collimating lens 86b next to the second multi-core fiber 96. The end portion 92 of the multi-core fiber 96 is also shaped with a curved surface (e.g., convex shape) to provide a function of a field lens.

Therefore, a telecentric imaging system is provided with a convex shaped curved surface for the end portion 82 of the first multi-core fiber 94 and for the end portion 92 of the second multi-core fiber 96 in the optical coupling device 80. The collimating lens pair 86a and 86b directs the light rays between the end portions 82 and 92. The end portions 82 and 92 function as field lenses in order for the off-axis rays 88 toward the center of the collimating lens 86.

Therefore, the end portions 82 and 92 of the first and second multi-core fibers 94 and 96, respectively, are configured to redirect the light 88 toward the center of the collimating lens 86, thereby passing all the light 88 through the imaging system of the optical coupling device 80 and thus eliminating or reducing optical inefficiencies.

Forming a convex surface (to be used as the field lens) on the end portions 82 and 92 of the first and second multi-core fibers 94 and 96, respectively, can be accomplished by using a $CO_2$ laser to cleave and melt the multi-core fibers 94 and 96 to form a convex surface on the end portions 82 and 92 of the multi-core fibers 94 and 96, respectively.

Figure 5:
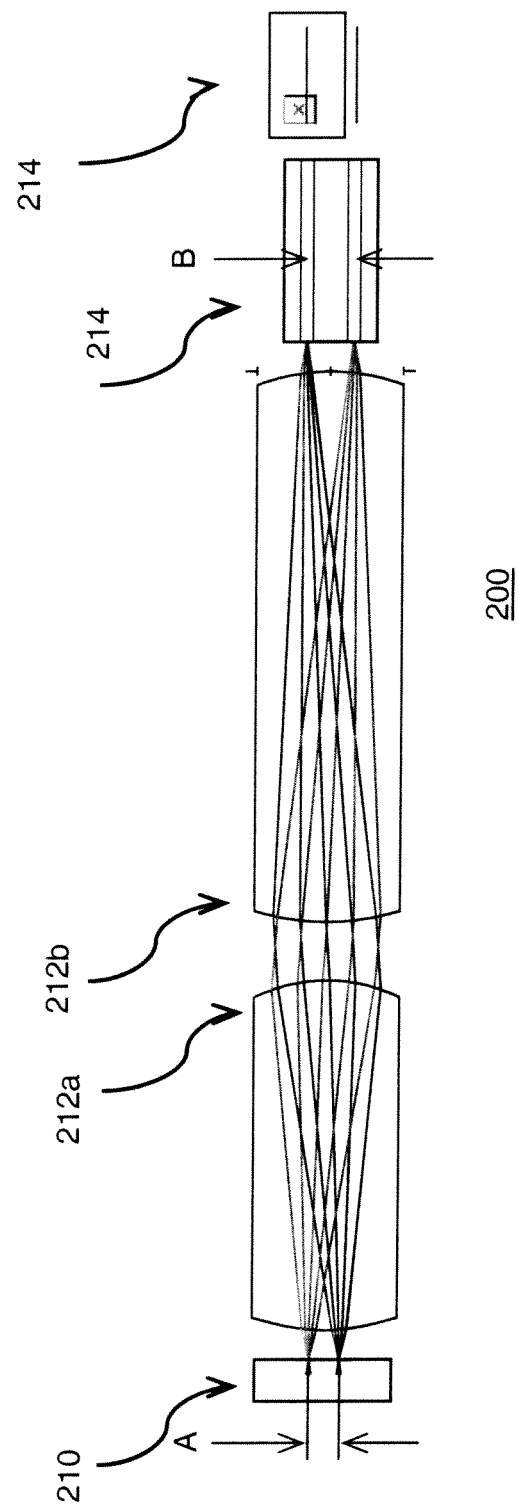
FIG. 5 shows a side view of the dual lens with field lens approach optical coupling arrangement of an exemplary embodiment of the invention where the object (VCSEL) is magnified on the image (fiber) side.

Referring to FIG. 5, a dual lens with field lens approach for an optical coupling arrangement 200 is provided. The object (e.g., VCSEL) 210 is magnified on the image (fiber) side (multi-core fiber 214) as shown. In this case the arrangement is similar to that of FIG. 4. However, the focal length of the collimating lenses 212a and 212b are different from each other in order to realize a magnification or reduction of the source to the image (multi-core fiber 214).

The source collimating lens 212a focal length is 600 microns and the image focusing lens 212b is 900 microns. Therefore, the source is magnified by 1.5×. As seen on the object 210, a distance A is provided between the sources, and when the light rays transmit through the lenses 212, the distance between the cores of the multi-core fibers is increased to a distance B. This magnification reduces the NA by that same factor. Hence the VCSEL (object 210) NA of 0.25 is reduced to an NA of 0.17 on the image side, making the NA more compatible with the NA of multi-core fibers 214 and improving the coupling efficiency as compared, for example, with the butt coupling approach shown in FIG. 1.

Figure 6:
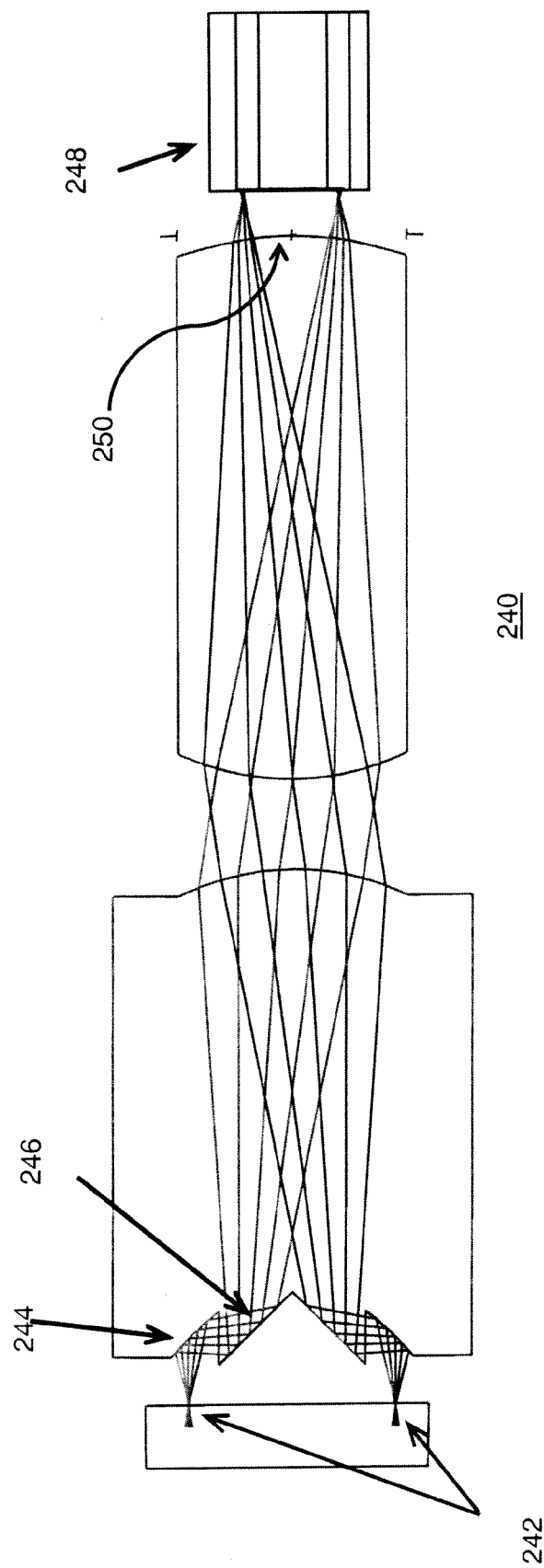
FIG. 6 shows another exemplary embodiment of the invention where the object source points are moved apart and a dual mirror translates the light beams towards the optical centerline.

FIG. 6 shows another exemplary embodiment, where the object source points 242 are moved apart and a dual mirror (curved mirror field lens 244 and reflective prism element 246) translates the light beams towards the optical centerline 250. In this arrangement, the light beam reflecting elements (curved mirror field lens 244 and reflective prism element 246), which replace the field lens, are built into the source lens element. These reflecting elements allow the VCSEL array at the source to be fabricated with the source elements widely separated. This may be advantageous for some VCSEL designs where more room is needed for the VCSEL source metallurgy and interconnect contacts.

Figure 7:
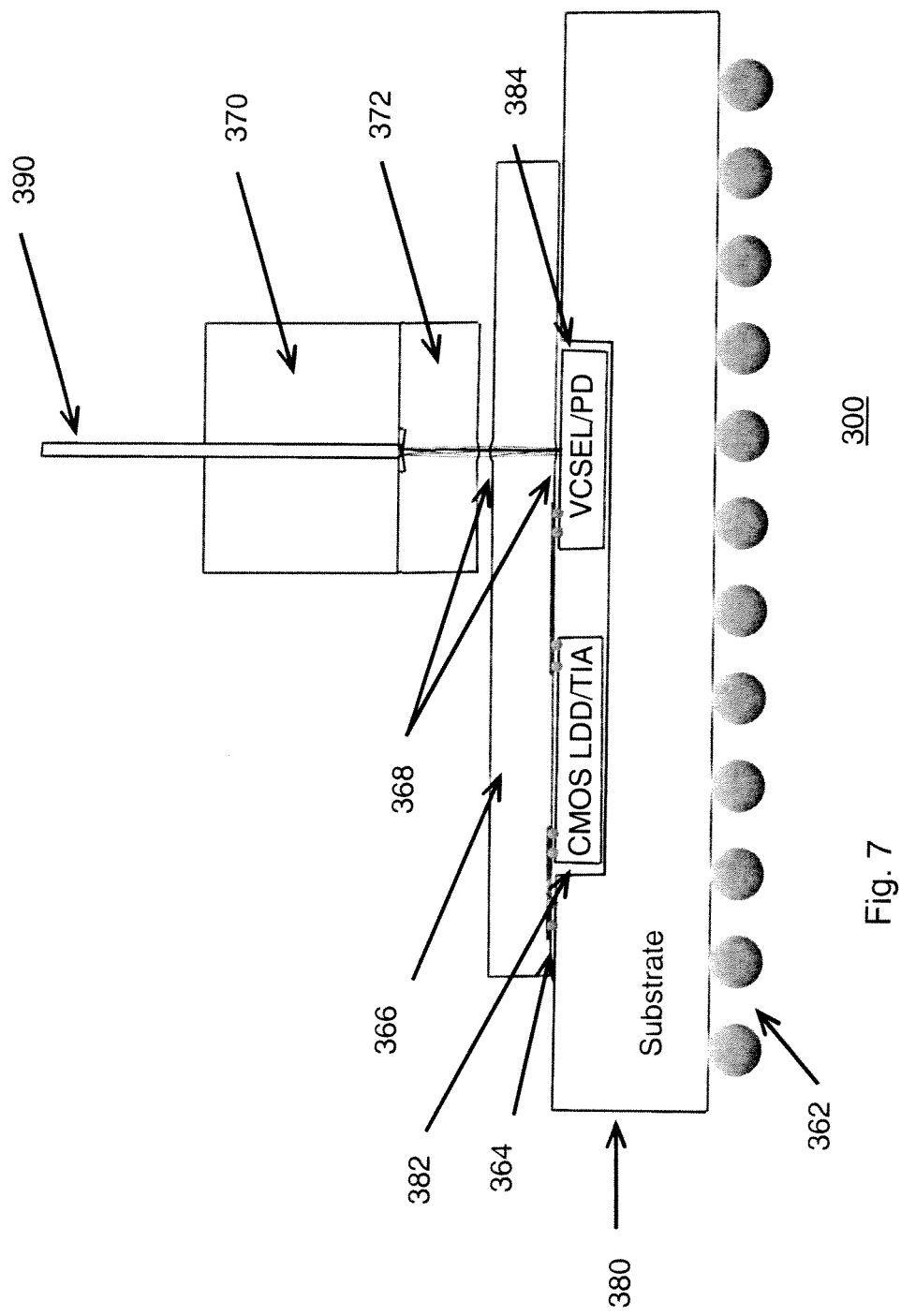
FIG. 7 shows an opto-electronic package incorporating a lens plate with wiring, attached CMOS drivers/TIA circuits, attached OE devices, mounted on a substrate interconnecting with a ferrule containing multi-core fiber and attached dual sided lens plate in an exemplary embodiment.

Referring to FIG. 7, an opto-electronic package 300 incorporates a lens plate with wiring 366, attached CMOS drivers/TIA circuits (e.g., CMOS LDD/TIA 382), attached OE devices (e.g., VCSEL/PD 384), mounted on a substrate 362 interconnecting with a ferrule 370 containing multi-core fibers 390 and attached dual sided lens plate 372. With this arrangement of the opto-electronic package 300, the source lens plate 366 incorporates the field lens and collimating lens. These lenses can be a single pair or an array of pairs as provided, for example, by the lens array 368. Typically, for example, arrays consist of a row of 12 lens pairs or multiple rows of 12 lens pairs. Wiring is patterned on the lens plate 366 along with pads (e.g., C4s as interconnects 364) in order to mount a VCSEL or PD array 384 and to mount a CMOS (Complementary Metal-Oxide Semiconductor) laser driver array (LDD) or a photodiode transimpedance amplifier array (TIA) device (i.e., CMOS LDD/TIA) 382. The lens plate 366 may then be mounted on a substrate containing the next level of interconnects such as a ball grid array or a land grid array (BGA/LGA) 362. Above the lens plate 366, a ferrule 370 containing multi-core fibers 390 and a dual-sided lens plate 372 is positioned to couple the light from and/or to the OE module to the fiber ribbon.

Figure 8:
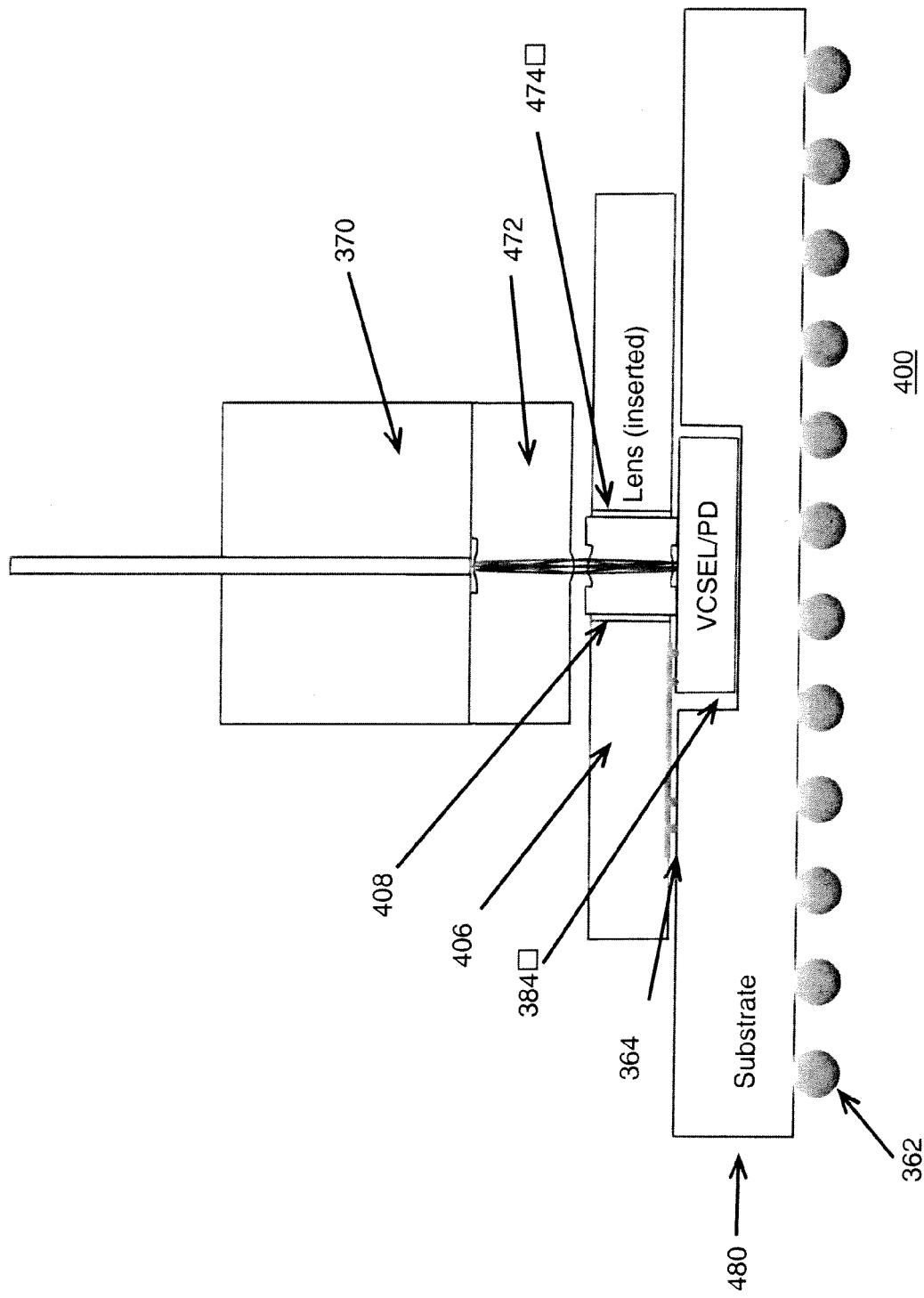
FIG. 8 shows an opto-electronic package incorporating a CMOS device with integrated drivers/TIA circuits with an opening to accommodate a dual sided lens array in an exemplary embodiment.

Referring to FIG. 8, an opto-electronic package 400 similar to the opto-electronic package 300 of FIG. 7 is provided. However, the lens plate 366 is replaced with a complementary metal-oxide semiconductor device with integrated laser diode drivers or trans-impedance amplifier circuits (CMOS LDD/TIA chip) 406 and an opening 408 in the CMOS device (CMOS LDD/TIA chip 406) is fabricated to accommodate a dual sided lens array (dual-sided lens plate) 474 of the dual-sided lens pair of 472 and 474. Therefore, the CMOS LDD/TIA chip 406 is provided with an opening 408 for the dual-sided lens array 474 to be inserted.

Wiring is patterned along with pads (e.g., C4s as interconnects 364) in order to mount a VCSEL or PD array 384 in a substrate 480 and to mount the CMOS LDD/TIA 406. The substrate 480 can contain the next level of interconnects such as a ball grid array or a land grid array (BGA/LGA) 362.

Figure 9:
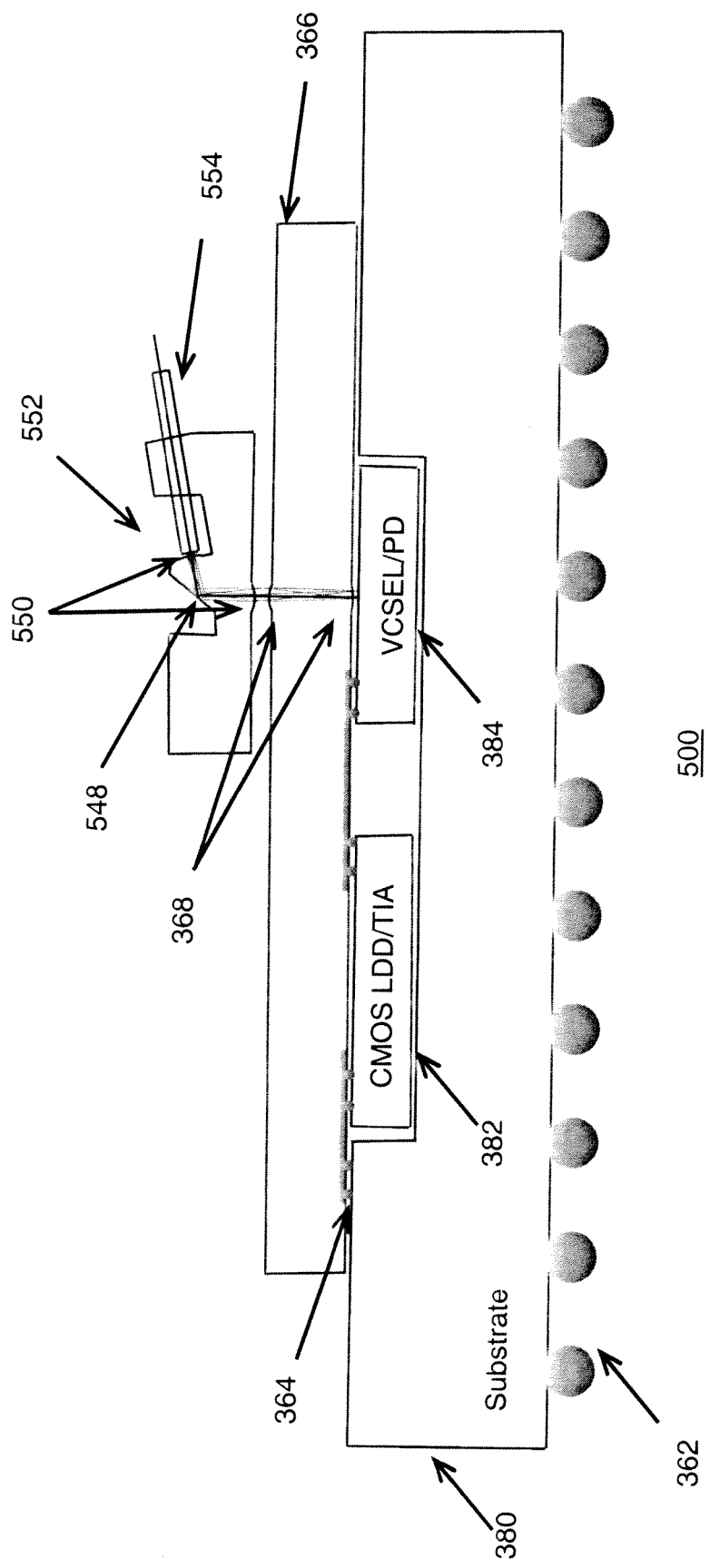
FIG. 9 shows an opto-electronic package with integrated lens plate which mates with an optical connector containing dual lens arrays and a turning mirror to bend the light at an angle in an exemplary embodiment.

Referring to FIG. 9, an opto-electronic package 500 with an integrated lens plate similar to that of FIG. 7 is provided (i.e., integrated lens plate 366 having dual-sided lens 368). However, the fiber ferrule (i.e., ferrule with the multi-core fiber 370) with the dual-sided lens plate 372 (See FIG. 7) is replaced with an optical connector (i.e., low profile lensed fiber connector 552) for the multi-core optical fiber 554 containing dual-sided lens arrays 550 and a turning mirror 548 to bend the light at an angle (See FIG. 9).

Figure 10A:
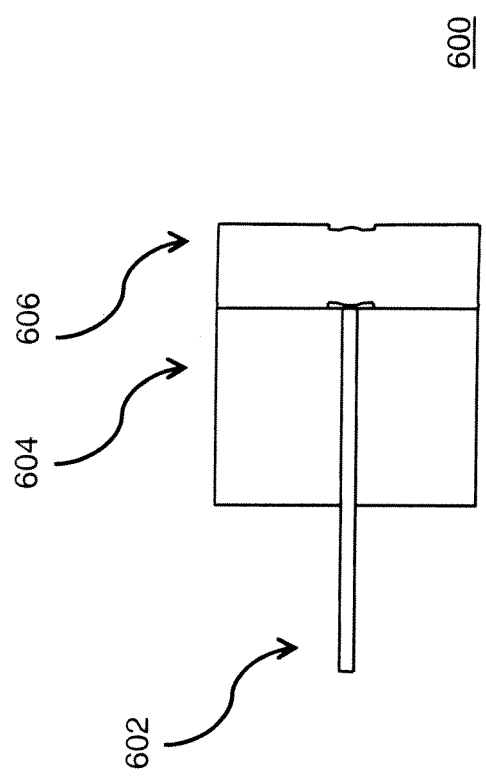
FIGS. 10A and 10B show an exemplary embodiment of a multi-core fiber dual lens connector mating with a similar connector.

Referring to FIG. 10A, an example of a multi-core fiber dual lens connector 600 is provided as another exemplary embodiment. In this case, a dual sided lens array 606, serving as the field lens and the collimating lens, may be attached to the end of the ferrule 604 with the multi-core fiber 602.

Figure 10B:
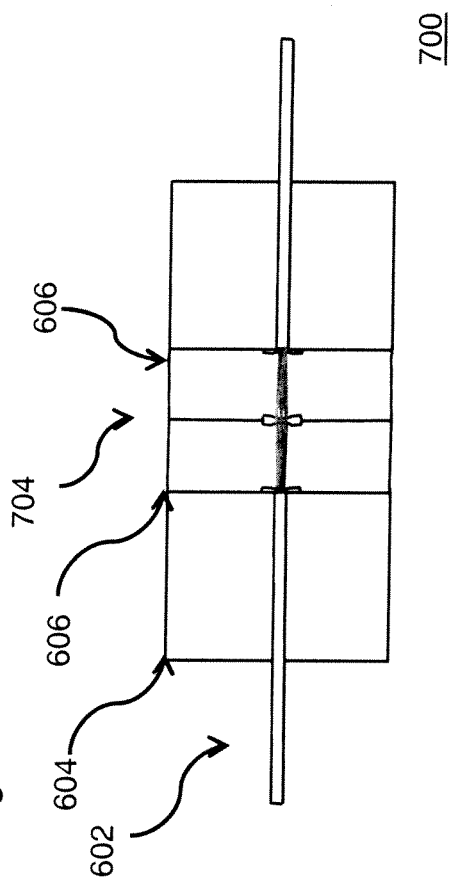

Referring to FIG. 10B, two multi-core fiber ferrules 600 are mated together at connection point 704 to form mated lensed multi-core fiber connectors 400 in another exemplary embodiment. By using the two dual sides lens arrays 606, the optical imaging performance is maintained despite the offset sources of the multi-core fiber 602.

Figure 11A:
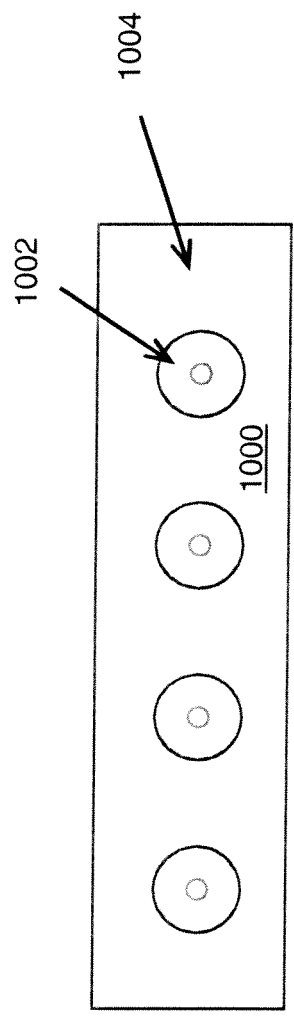
FIG. 11A shows an end view of a conventional fiber in ferrule connector

Referring to FIG. 11A, an end view of a fiber in ferrule connector 1000 of a related art is provided. The optical fibers 1002, for example, are arranged 12 per row, with a single ferrule 1004 containing a single or multiple rows in a single housing. In this case since single mode fibers (fiber with a single core 1002) are used, the fiber's rotational orientation with the ferrule guide hole is not a concern.

Figure 11B:
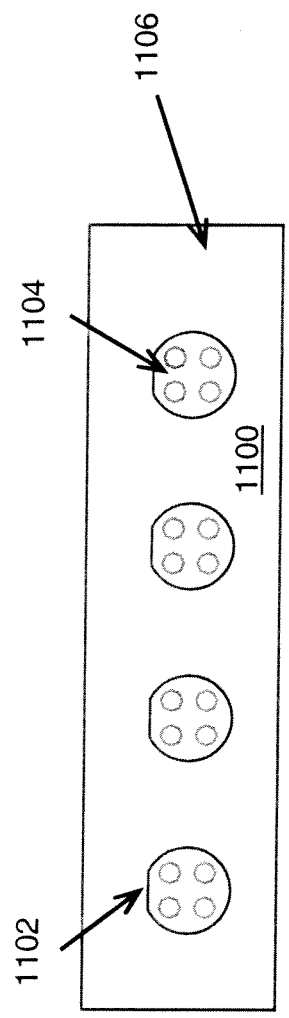
FIG. 11B shows an end view of a fiber (with flat for alignment) in a keyed ferrule in exemplary embodiment of the invention.

Referring to FIG. 11B, an end view of a multi-core fiber 1104 with an alignment flat 1102 fabricated as part of the optical fiber cladding to form the fiber in ferrule connector 1100 is provided as an exemplary embodiment of the invention. The flat 1102 on fiber is to facilitate multi-core fiber 1104 rotational alignment. The cores of the multi-core fiber 1104 are accurately positioned in the cladding with respect to the flat 1102 or other alignment feature. This flat alignment 1102 may then be used to rotationally orientate the optical fiber 1104 within the ferrule 1106. The ferrule 1106 is fabricated to contain a hole with a flat 1102 or other feature that will accept the fiber 1104 and define its rotational orientation.

Figure 11C:
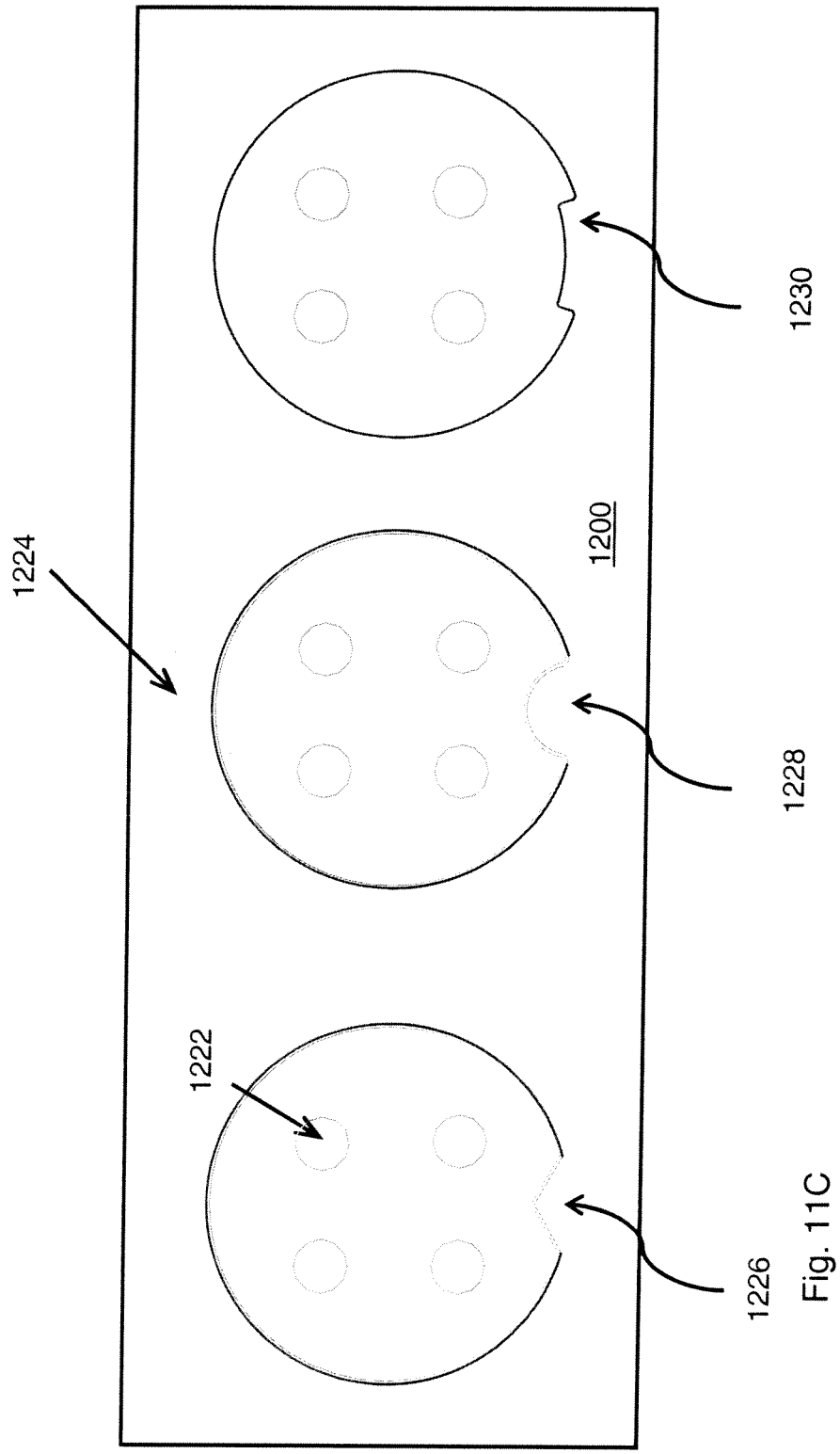
FIG. 11C illustrates notches on fiber to facilitate multi-core fiber rotation alignment in an exemplary embodiment of the invention.

Referring to FIG. 11C, another fiber rotational alignment structure 1200 of an exemplary embodiment of the invention is shown. In addition to a flat 1102 on the fiber 1104 shown in FIG. 11B, the multi-core fiber 1222 could have a v-groove 1226, a rounded groove 1228, a rectangular-shaped groove 1230 or other feature or equivalent feature to insure rotational alignment of the multi-core fiber 1222 with the ferrule 1224. The grooves 1226, 1228 and 1230 on multi-core fiber 1222 facilitates the multi-core fiber rotational alignment.

Therefore, based on the foregoing exemplary embodiments of the invention, an optical interconnect for a multi-core optical fiber with a compact optical transceiver is provided using unique optical elements, thereby leading to improved optical coupling performance, a simpler package and lower cost.

Although an example of the optical coupling device is shown using a field lens or other substitute for the field lens, it will be appreciated that other optic configurations can be used. Also, although the optical coupling device is useful to provide greater bandwidth in computer systems, it can also be used in audio/visual systems, telecommunications, and other devices or techniques that transmit information over a distance of a first point to a second point.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:
1. An optical coupling system, comprising:
    a first unit including a source of light or a first multi-core optical fiber, each of the source and the first multi-core optical fiber including at least a first aperture;
    a second unit including a second multi-core optical fiber including at least a second aperture corresponding to the first aperture of the first unit;
    a lens array unit redirecting light between the first unit and the second unit, the lens array unit substantially matching light rays transmitted or received between the first aperture of the first unit and the corresponding second aperture of the second unit; and
    a field lens arranged on the first unit.

2. The optical coupling system of claim 1, wherein the lens array unit comprises a field lens configured to redirect light toward a center of a light path from the first unit to the second unit, and
   wherein the field lens of the lens array unit is separated from the first and second units by a predetermined distance.

3. The optical coupling system of claim 1, wherein the lens array unit comprises a dual sided lens array including a field lens facing the first unit and a collimating lens on another side of the field lens, to redirect light toward a center of a light path from the first unit to the second unit and
   wherein the lens array unit including the field lens is separated from the first and second units by a predetermined distance.

4. The optical coupling system of claim 1, wherein the lens array unit includes a dual sided lens array, the dual sided lens array comprising:
   a first dual sided lens including a field lens facing the first unit and a collimating lens on another side of the field lens to redirect light toward a center of a light path from the first unit to the second unit; and
   a second dual sided lens including a field lens facing the second unit and a collimating lens on another side of the field lens to receive or send light between the first and second dual sided lenses, in order to redirect light toward a center of a light path from the first unit to the second unit.

5. The optical coupling system of claim 1, wherein the first unit comprises the first multi-core optical fiber, and
   wherein the lens array unit comprises a field lens configured to redirect light toward a predetermined area of a light path from the first unit to the second unit.

6. The optical coupling system of claim 1, wherein the lens array unit comprises a lens pair, with a first lens having a focal length different than a focal length of a second lens to select a magnification or reduction of transmitted and received light, in order to reduce a numerical aperture of light received at the second multi-core optical fiber or the first multi-core optical fiber.

7. The optical coupling system of claim 1, wherein the lens array unit comprises:
   a first dual sided lens being adjacent to the first unit; and
   a second dual sided lens being adjacent to the second unit and having a focal length greater than a focal length of the first dual sided lens.

8. The optical coupling system of claim 1, wherein the first unit comprises the source including at least two source points set apart, and
   wherein the lens array unit comprises a curved mirror field lens and a reflective prism element that translates the light beams towards an optical centerline between the first unit and the second unit.

9. The optical coupling system of claim 1, wherein the lens array unit substantially matching light rays transmitted and received between the first aperture of the first unit and the corresponding second aperture of the second unit,
   wherein the first unit comprises the first multi-core optical fiber, and
   wherein the first and second multi-core optical fibers each has a convex shaped end facing the lens array unit to redirect light toward a center line of an optical path between the first unit and the second unit.

10. The optical coupling system of claim 1, wherein the source in the first unit comprises a vertical cavity surface emitting laser (VCSEL) and/or a photodiode (PD) array.

11. The optical coupling system of claim 1, wherein the source in the first unit comprises an opto-electronic (OE) module including the lens array unit with conductive wiring.

12. The optical coupling system of claim 1, wherein the source in the first unit comprises a complementary metal-oxide semiconductor device integrated with laser diode drivers/trans-impedance amplifier (CMOS LDD/TIA) with an opening for an insertion of the lens array unit.

13. The optical coupling system of claim 1, wherein the source in the first unit comprises an OE module, and
   wherein the lens array unit comprises a dual sided lens array attached to a ferrule optical connector.

14. The optical coupling system of claim 1, wherein the source in the first unit comprises an OE module, and
   wherein the lens array unit comprises a dual sided lens array with an optical connector including dual lenses, a turning mirror, and guide holes for the second multi-core optical fiber.

15. The optical coupling system of claim 1, wherein the second unit comprises a flat portion in a fiber cladding and a corresponding flat portion in a fiber ferrule for fiber rotational orientation.

16. The optical coupling system of claim 1, wherein the second unit comprises a groove in a fiber cladding of the second multi-core optical fiber for fiber rotational orientation.

17. The optical coupling system of claim 1, further comprising a dual sided lensed optical connector to couple the second multi-core optical fiber of the second unit with the lens array unit and the first unit.

18. A telecentric imaging system for an optical coupling device, the telecentric imaging system comprising:
   an array of dual sided lenses, comprising:
      a first dual sided lens unit including a lens facing a source object of light to direct light from the source to a multi-core optical fiber toward an optical center line between the source and the multi-core optical fiber; and
      a second dual sided lens unit set apart from the first dual sided lens unit, the second dual sided lens unit being next to the multi-core optical fiber to direct light between the source and the multi-core optical fiber unit toward the optical center line between the source and the multi-core optical fiber unit.

19. The telecentric imaging system according to claim 18, wherein:
   the first dual sided lens unit includes a first field lens facing the source object and a first collimating lens on another side of the first dual sided lens unit to direct light toward an optical center line between the source and the multi-core optical fiber; and
   the second dual sided lens unit includes a field lens facing the multi-core optical fiber unit and a second collimating lens facing the first collimating lens to direct light toward an optical center line between the source and the multi-core optical fiber unit.

20. The telecentric imaging system according to claim 18, wherein at least one of the first dual sided lens unit and the second dual sided lens unit comprises a field lens to direct light from an aperture of the source object to a corresponding aperture of the multi-core optical fiber.

21. The telecentric imaging system according to claim 18, wherein at least one of the first dual sided lens unit and the second dual sided lens unit comprises field lens means to substantially match the light received to apertures of the multi-core optical fiber.

22. A method of an optical coupling system, the method comprising:
- transmitting light from a source object to a multi-core optical fiber;
- receiving the light, by the multi-core optical fiber, from the source object; and
- redirecting light, by a dual-sided lens array, from the source object to the multi-core optical fiber, the dual-sided lens array substantially matching light rays emitted from points of the source object and light rays received at corresponding points of the multi-core optical fiber,
- wherein the redirecting of light comprises redirecting the light toward a center of a light path from the source object to the multi-core optical fiber by the dual-sided lens array including a field lens.

* * * * *